United States Patent
Hanrahan

(10) Patent No.: US 11,939,926 B2
(45) Date of Patent: Mar. 26, 2024

(54) SELECTIVE POWER DISTRIBUTION FOR AN AIRCRAFT PROPULSION SYSTEM

(71) Applicant: Raytheon Technologies Corporation, Farmington, CT (US)

(72) Inventor: Paul R. Hanrahan, Sedona, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/888,955

(22) Filed: Aug. 16, 2022

(65) Prior Publication Data
US 2024/0060453 A1    Feb. 22, 2024

(51) Int. Cl.
   *F02C 7/36*          (2006.01)
   *F02C 3/107*        (2006.01)
   *F02C 6/08*          (2006.01)

(52) U.S. Cl.
CPC ............. *F02C 7/36* (2013.01); *F02C 3/107* (2013.01); *F02C 6/08* (2013.01)

(58) Field of Classification Search
CPC ............. F02C 3/107; F02C 6/08; F02C 7/36
See application file for complete search history.

(56) References Cited

U.S. PATENT DOCUMENTS

| | | | |
|---|---|---|---|
| 3,678,690 A | 7/1972 | Shohet | |
| 4,651,521 A | 3/1987 | Ossi | |
| 4,791,783 A | 12/1988 | Neitzel | |
| 5,209,428 A | 5/1993 | Bevilaqua | |
| 6,269,627 B1 | 8/2001 | Freese | |
| 6,270,037 B1 | 8/2001 | Freese | |
| 10,337,409 B2 | 7/2019 | Bedrine | |
| 10,578,028 B2* | 3/2020 | Becker, Jr. | F02C 7/32 |
| 10,876,411 B2 | 12/2020 | Ramirez | |
| 10,914,234 B1* | 2/2021 | O'Flarity | F02C 9/18 |
| 10,968,748 B2 | 4/2021 | Ramirez | |
| 11,073,160 B2 | 7/2021 | Murugan | |
| 11,077,949 B2* | 8/2021 | Behrens | F01D 15/10 |
| 2017/0051679 A1 | 2/2017 | Becker, Jr. | |
| 2018/0009536 A1 | 1/2018 | Christopherson | |
| 2020/0017229 A1* | 1/2020 | Steinert | F02K 3/075 |
| 2020/0108937 A1* | 4/2020 | Behrens | F02C 9/18 |
| 2021/0054784 A1 | 2/2021 | O'Flarity | |
| 2023/0228216 A1* | 7/2023 | Miller | F02C 7/18 244/134 B |
| 2023/0228231 A1* | 7/2023 | Miller | F02C 9/18 60/783 |

OTHER PUBLICATIONS

EP Search Report for EP Patent Application No. 23191746.9 dated Dec. 20, 2023.

* cited by examiner

*Primary Examiner* — Lorne E Meade
(74) *Attorney, Agent, or Firm* — Getz Balich LLC

(57) ABSTRACT

An assembly is provided for an aircraft propulsion system. This assembly includes a compressor section, a combustor section, a turbine section and a flowpath extending sequentially through the compressor section, the combustor section and the turbine section. The assembly also includes a rotating structure, a geartrain, a propulsor rotor and a turbine. The rotating structure includes a turbine rotor within the turbine section. The geartrain is coupled to the rotating structure. The propulsor rotor is coupled to the geartrain. The rotating structure is configured to drive rotation of the propulsor rotor through the geartrain. The turbine is coupled to the geartrain. The turbine is configured to receive bleed gas from the flowpath.

17 Claims, 6 Drawing Sheets

SELECTIVE POWER DISTRIBUTION FOR AN AIRCRAFT PROPULSION SYSTEM

BACKGROUND OF THE DISCLOSURE

1. Technical Field

This disclosure relates generally to an aircraft and, more particularly, to an aircraft propulsion system for alternately generating power for multi-directional propulsion.

2. Background Information

Various types and configurations of propulsion systems are known in the art for an aircraft. While these known aircraft propulsion systems have various benefits, there is still room in the art for improvement.

SUMMARY OF THE DISCLOSURE

According to an aspect of the present disclosure, an assembly is provided for an aircraft propulsion system. This assembly includes a compressor section, a combustor section, a turbine section and a flowpath extending sequentially through the compressor section, the combustor section and the turbine section. The assembly also includes a rotating structure, a geartrain, a propulsor rotor and a turbine. The rotating structure includes a turbine rotor within the turbine section. The geartrain is coupled to the rotating structure. The propulsor rotor is coupled to the geartrain. The rotating structure is configured to drive rotation of the propulsor rotor through the geartrain. The turbine is coupled to the geartrain. The turbine is configured to receive bleed gas from the flowpath.

According to another aspect of the present disclosure, another assembly is provided for an aircraft propulsion system. This assembly includes a first propulsor rotor, a second propulsor rotor, a geartrain, an engine core and a turbine. The engine core includes a compressor section, a combustor section, a turbine section, a flowpath and a rotating structure. The flowpath extends through the compressor section, the combustor section and the turbine section. The rotating structure includes a turbine rotor within the turbine section. The rotating structure is configured to drive rotation of the first propulsor rotor and the second propulsor rotor through the geartrain. The turbine is configured to drive rotation of the second propulsor rotor through the geartrain. The turbine is configured to receive bleed gas from the flowpath.

According to still another aspect of the present disclosure, another assembly is provided for an aircraft propulsion system. This assembly includes a propulsor rotor, an engine core and an air turbine. The engine core includes a compressor section, a combustor section, a turbine section, a flowpath and a rotating structure. The flowpath extends through the compressor section, the combustor section and the turbine section. The rotating structure includes a turbine rotor within the turbine section. The rotating structure is configured to drive rotation of the propulsor rotor. The air turbine is configured to receive bleed air from the compressor section. The air turbine is configured to drive rotation of the propulsor.

The assembly may also include an epicyclic geartrain coupling the propulsor rotor to the rotating structure and the air turbine.

The geartrain main include a sub gear, a ring gear, a plurality of intermediate gears and a carrier. The sun gear may be coupled to the second propulsor rotor. The ring gear may be coupled to the turbine. Each of the intermediate gears may be between and meshed with the sun gear and the ring gear. The carrier may be coupled to the rotating structure and the first propulsor rotor. Each of the intermediate gears may be rotatably mounted to the carrier.

The turbine may be configured as or otherwise include an air turbine.

The bleed gas may be bleed air from the compressor section.

The compressor section may include a low pressure compressor section and a high pressure compressor section. The turbine may be configured to receive the bleed gas from the high pressure compressor section.

The assembly may also include a power transmission device coupling the geartrain to the propulsor rotor. The turbine may be configured to drive rotation of the power transmission device through the geartrain.

The turbine may be configured to drive rotation of the power transmission device down to a zero rotational speed.

The assembly may also include a lock device configured to lock rotation of the power transmission device when the power transmission device is at the zero rotational speed.

The lock device may be configured as or otherwise include a splined coupling.

The geartrain may include a sun gear, a ring gear, a plurality of intermediate gears and a carrier. The sun gear may be coupled to the propulsor rotor. The ring gear may be coupled to the turbine. Each of the intermediate gears may be between and meshed with the sun gear and the ring gear. The carrier may be coupled to the rotating structure. Each of the intermediate gears may be rotatably mounted to the carrier.

The turbine may be configured to drive rotation of the sun gear down to a zero rotational speed.

The assembly may also include a lock device configured to lock rotation of the sun gear when the sun gear is at the zero rotational speed.

The assembly may also include a lock device configured to lock rotation of the ring gear when the ring gear is at a zero rotational speed.

The assembly may also include a first propulsor rotor. The rotating structure may be configured to drive rotation of the first propulsor rotor through geartrain. The propulsor rotor may be a second propulsor rotor.

The turbine may be configured to stop rotation of the second propulsor rotor while the first propulsor rotor continues to rotate.

A rotational axis of the first propulsor rotor may be angularly offset from a rotational axis of the second propulsor rotor.

The assembly may also include a flex joint connecting the geartrain to the propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
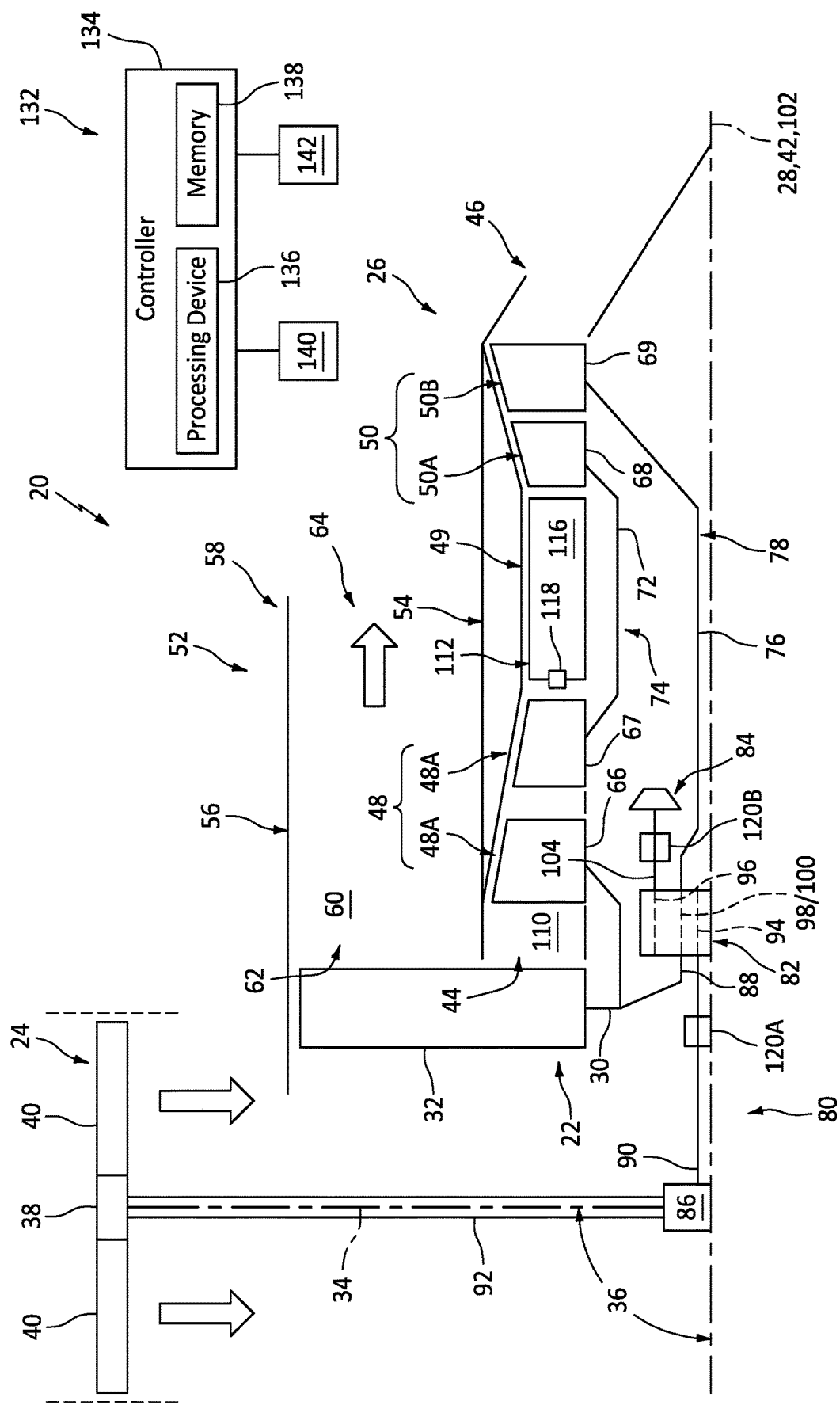
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal (e.g., forward) flight mode where the first direction propulsion is substantially horizontal (e.g., within 5 degrees, 10 degrees, etc. of a horizontal axis) propulsive thrust. The second mode may be a vertical flight and/or hover mode where the second direction propulsion is substantially vertical (e.g., within 5 degrees, 10 degrees, etc. of a vertical axis) propulsive lift. The aircraft propulsion system 20, of course, may also be configured to generate both the first direction (e.g., horizontal) propulsion and the second direction (e.g., vertical) propulsion during a third (e.g., transition) mode of operation. The aircraft propulsion system 20 of FIG. 1 includes at least one bladed first propulsor rotor 22, at least one bladed second propulsor rotor 24 and a gas turbine engine core 26 configured to rotatably drive the first propulsor rotor 22 and the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground. The first propulsor rotor 22 includes at least a first rotor disk 30 and a plurality of first rotor blades 32 (on visible in FIG. 1); e.g., fan blades. The first rotor blades 32 are distributed circumferentially around the first rotor disk 30 in an annular array. Each of the first rotor blades 32 is connected to and projects radially (relative to the first rotor axis 28) out from the first rotor disk 30.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 34. This second rotor axis 34 is an axial centerline of the second propulsor rotor 24 and may be vertical when the aircraft is on the ground. The second rotor axis 34 is angularly offset from the first rotor axis 28 by an included angle 36; e.g., an acute angle or a right angle. This included angle 36 may be between sixty degrees (60°) and ninety degrees (90°); however, the present disclosure is not limited to such an exemplary relationship. The second propulsor rotor 24 includes at least a second rotor disk 38 and a plurality of second rotor blades 40; e.g., open rotor blades. The second rotor blades 40 are distributed circumferentially around the second rotor disk 38 in an annular array. Each of the second rotor blades 40 is connected to and projects radially (relative to the second rotor axis 34) out from the second rotor disk 38.

The engine core 26 extends axially along a core axis 42 between and to a forward, upstream airflow inlet 44 of the engine core 26 and an aft, downstream exhaust 46 of the engine core 26. The core axis 42 may be an axial centerline of the engine core 26 and may be horizontal when the aircraft is on the ground. This core axis 42 may be parallel (e.g., coaxial) with the first rotor axis 28 and, thus, angularly offset from the second rotor axis 34. The engine core 26 includes a compressor section 48, a combustor section 49 and a turbine section 50. The compressor section 48 of FIG. 1 includes a low pressure compressor (LPC) section 48A and a high pressure compressor (HPC) section 48B. The turbine section 50 of FIG. 1 includes a high pressure turbine (HPT) section 50A and a low pressure turbine (LPT) section 50B.

The engine sections 48A-50B are arranged sequentially along the core axis 42 within an engine housing 52. This engine housing 52 includes an inner case 54 (e.g., a core case) and an outer case 56 (e.g., a fan case). The inner case 54 may house one or more of the engine sections 48A-50B; e.g., the engine core 26. The outer case 56 may house the first propulsor rotor 22. The outer case 56 of FIG. 1 also axially overlaps and extends circumferentially about (e.g., completely around) the inner case 54 thereby at least partially forming a (e.g., annular) bypass duct 58. The bypass duct 58 includes a (e.g., annular) bypass flowpath 60 disposed outside (e.g., radially outboard) of the engine core 26. The bypass flowpath 60 extends axially through the bypass duct 58, along the engine core 26 and its core axis 42, between and to a forward, upstream airflow inlet 62 of the bypass duct 58 and an aft, downstream exhaust 64 of the bypass duct 58.

Each of the engine sections 48A, 48B, 50A and 50B includes a bladed rotor 66-69 within that respective engine section 48A, 48B, 50A and 50B. Each of these bladed rotors 66-69 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The HPC rotor 67 is connected to the HPT rotor 68 through a high speed shaft 72. At least (or only) these engine components 67, 68 and 72 collectively form a high speed rotating structure 74 of the aircraft propulsion system 20. This high speed rotating structure 74 and its components 67, 68 and 72 are rotatable about the core axis 42. The LPT rotor 69 is connected to a low speed shaft 76. At least (or only) these engine components 69 and 76 collectively form a low speed rotating structure 78 of the aircraft propulsion system 20. This low speed rotating structure 78 and its components 69 and 76 are rotatable about the core axis 42. The low speed rotating structure 78 and, more particularly, its low speed shaft 76 may project axially through a bore of the high speed rotating structure 74 and its high speed shaft 72.

The aircraft propulsion system 20 of FIG. 1 includes a powertrain 80 that couples the low speed rotating structure 78 to the first propulsor rotor 22 and the second propulsor rotor 24. The powertrain 80 of FIG. 1 includes a geartrain 82, an auxiliary turbine 84 and a gear system 86; e.g., bevel gearing. The powertrain 80 of FIG. 1 also includes one or more additional power transmission devices, such as shafts 88, 90 and 92, for coupling the geartrain 82 to the first propulsor rotor 22 and the second propulsor rotor 24.

Figure 2:
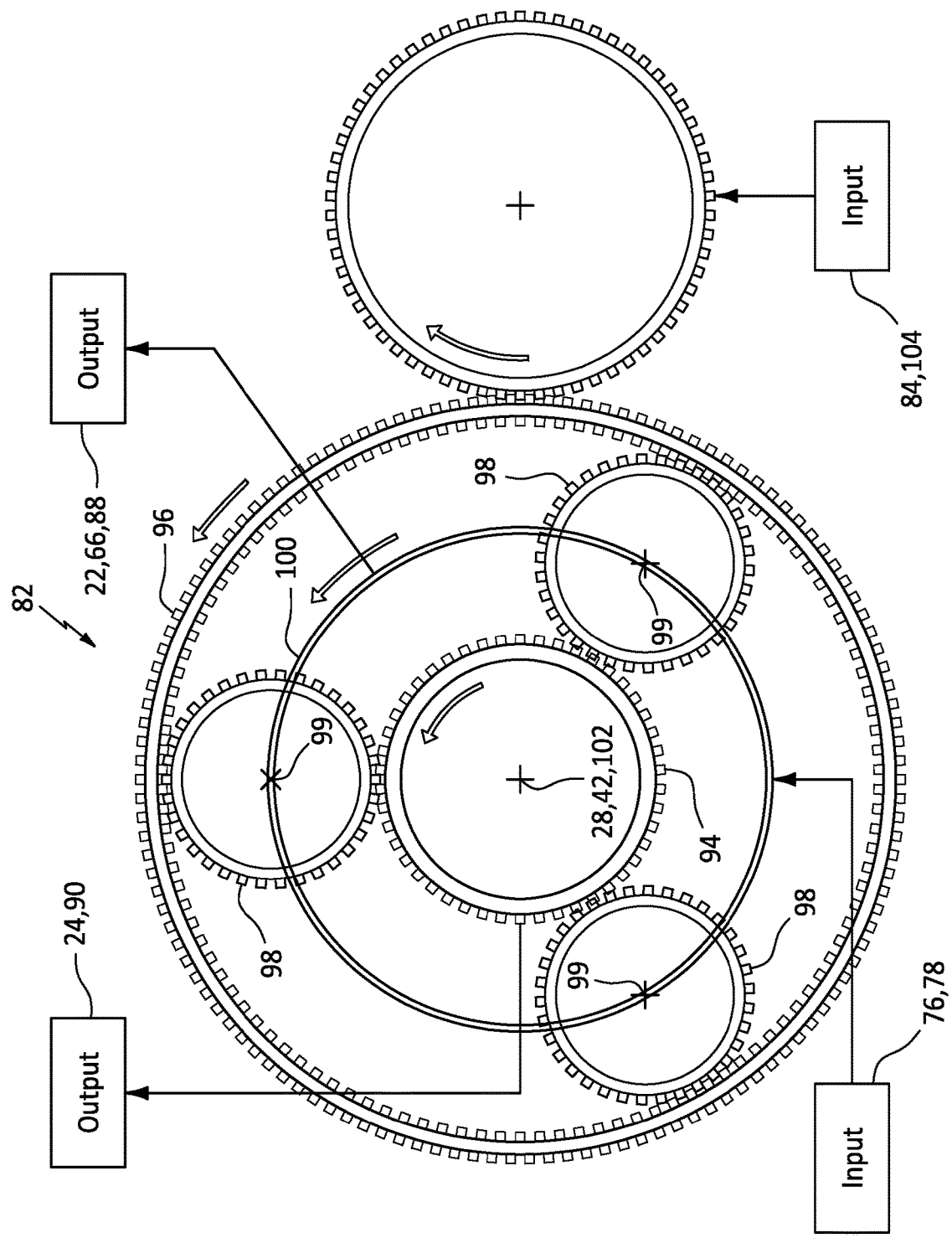
FIG. 2 is a schematic illustration of a geartrain within a powertrain for the aircraft propulsion system of FIG. 1.

Referring to FIGS. 1 and 2, the geartrain 82 may be configured as a biased torque differential. This geartrain 82 may transfer power from the low speed rotating structure 78 to the second propulsor rotor 24 during the second mode of operation. The geartrain 82 may also facilitate locking (e.g., stopping, preventing) rotation of the second propulsor rotor 24 about its second rotor axis 34 during the first mode of operation.

The geartrain 82 of FIG. 2 includes a sun gear 94 (e.g., an inner gear), a ring gear 96 (e.g., an outer gear), one or more intermediate gears 98 (e.g., planet or star gears) and a gear carrier 100. The sun gear 94 is rotatable about a centerline axis 102 of the geartrain 82, which centerline axis 102 may be parallel (e.g., coaxial) with the axis 28, 42. The ring gear 96 is rotatable about the centerline axis 102. The ring gear 96 extends circumferentially around (e.g., circumscribes) the sun gear 94 and an annular array of the intermediate gears 98. The intermediate gears 98 are arranged circumferentially about the centerline axis 102 in the annular array. Each of the intermediate gears 98 is radially between and meshed with the sun gear 94 and the ring gear 96. Each of the intermediate gears 98 is rotatable about a respective intermediate gear axis 99, and is rotatably mounted to and supported by the gear carrier 100. The gear carrier 100 is rotatable about the centerline axis 102.

The auxiliary turbine 84 of FIGS. 1 and 2 is coupled to the ring gear 96 through a power transmission coupling 104 (e.g., a gear and a shaft, etc.), where the power transmission coupling 104 provides a power input for the geartrain 82. It is further contemplated that the auxiliary turbine 84 may also or alternatively be coupled to the ring gear 96 through a geartrain (and/or other device(s)) such that the auxiliary turbine 84 may reside remote from the geartrain 82 and its ring gear 96; for example, mounted to the inner case 52 or the outer case 54 of FIG. 1.

Figure 3:
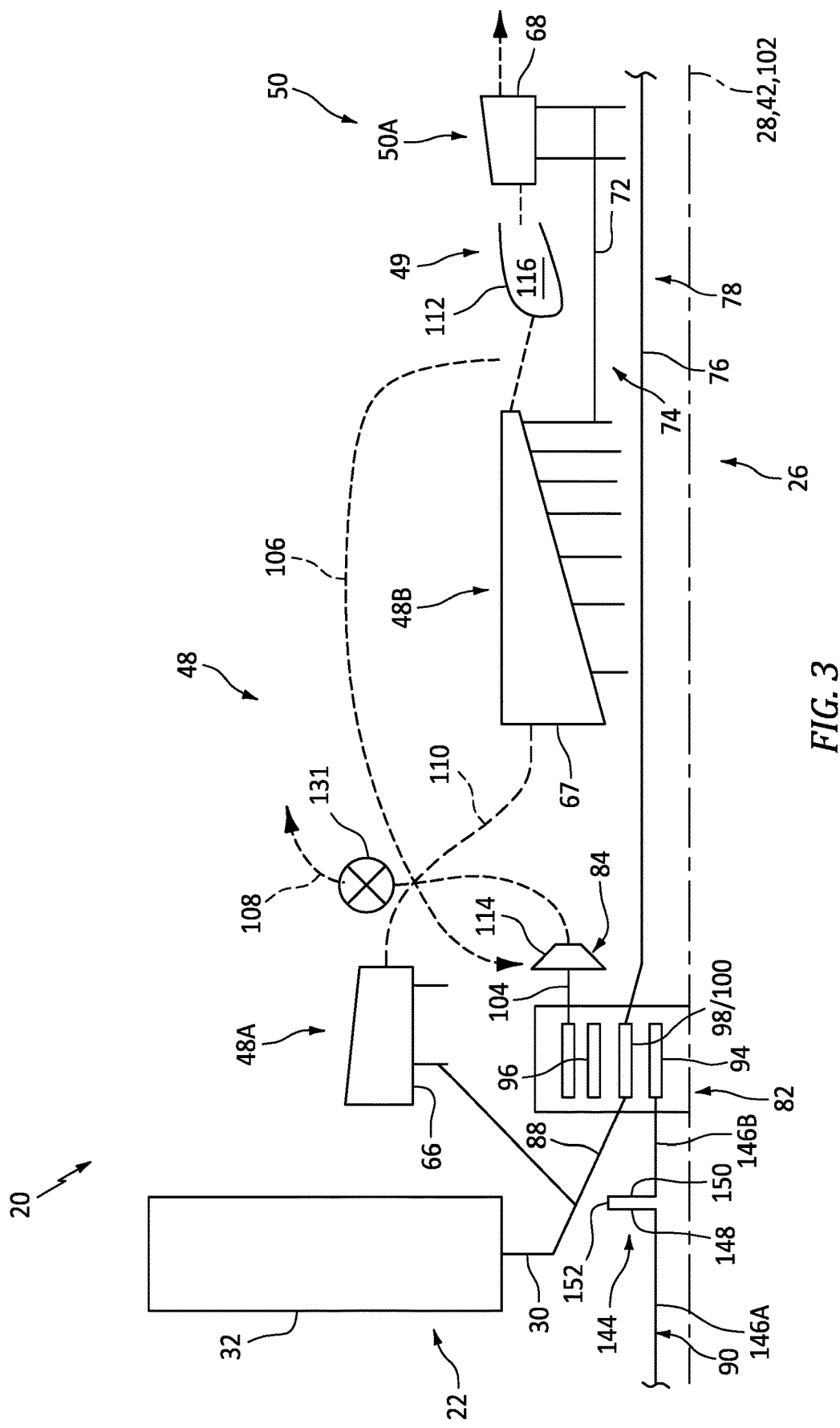
FIG. 3 is another partial, schematic illustration of the aircraft propulsion system of FIG. 1 shown with a bleed circuit and an exhaust circuit for an auxiliary turbine.

Referring to FIG. 3, the auxiliary turbine 84 may be configured as an air turbine, a free turbine or any other type of turbine powered by (e.g., driven by) gas bled from the engine core 26. The aircraft propulsion system 20 of FIG. 3, for example, includes a bleed circuit 106 and an exhaust circuit 108 for the auxiliary turbine 84. The bleed circuit 106 is configured to bleed gas (e.g., compressed air) from a core flowpath 110 of the engine core 26, and provide the bleed gas (e.g., the bleed air) to an inlet of the auxiliary turbine 84. The bleed circuit 106 may bleed the gas from the compressor section 48 (or alternatively another section of the engine core 26). The bleed circuit 106 of FIG. 3, for example, is configured to bleed the gas from the HPC section 48B at a location, for example, along the core flowpath 110 between the HPC section 48B and a (e.g., annular) combustor 112 within the combustion section 49. The exhaust circuit 108 is configured to receive expanded bleed gas from an outlet (e.g., an exhaust) of the auxiliary turbine 84, and direct that exhausted bleed gas into a flowpath of the aircraft propulsion system (e.g., the bypass flowpath 60 or the core flowpath 110). Alternatively, the exhaust circuit 108 may direct the exhausted bleed gas directly into an environment outside of the aircraft propulsion system 20. The present disclosure, however, is not limited to the foregoing exemplary bleed circuit and/or exhaust circuit configurations.

The auxiliary turbine 84 of FIG. 3 includes a bladed auxiliary turbine rotor 114. This auxiliary turbine rotor 114 includes a plurality of turbine blades arranged circumferentially around and connected to one or more respective rotor disks. The turbine rotor blades, for example, may be formed integral with or mechanically fastened, welded, brazed, adhered and/or otherwise attached to the respective rotor disk(s). The auxiliary turbine 84 may be configured as an axial flow turbine or a radial flow turbine, and the auxiliary turbine 84 may include one or more stages; e.g., rows/arrays of its turbine blades.

The sun gear 94 of FIGS. 1 and 2 is coupled to the second propulsor rotor 24 through the power transmission path elements 86, 90 and 92 (see FIG. 1), where the geartrain output shaft 90 provides a power output from the geartrain 82. The gear carrier 100 and, thus, the intermediate gears 98 are coupled to the first propulsor rotor 22 and the LPC rotor 66 through the first propulsor/LPC rotor shaft 88, where the shaft 88 provides another power output from the geartrain 82. The gear carrier 100 and, thus, the intermediate gears 98 are also coupled to the low speed rotating structure 78 and its LPT rotor 69 through the low speed shaft 76, where the low speed shaft 76 provides another power input to the geartrain 82.

An input to the gear system 86 is connected to the geartrain 82 and its sun gear 94 through the geartrain output shaft 90. An output of the gear system 86 is connected to the second propulsor rotor 24 through the second propulsor shaft 92. This gear system 86 provides a power transmission coupling between the geartrain 82 and its sun gear 94 rotating about the axis 28, 42, 102 and the second propulsor shaft 92 rotating about the second rotor axis 34. The gear system 86 may also provide a speed change mechanism between the geartrain output shaft 90 and the second propulsor shaft 92. The gear system 86, however, may alternatively provide a 1:1 rotational coupling between the geartrain output shaft 90 and the second propulsor shaft 92 such that these shafts 90 and 92 rotate at a common (e.g., the same) speed. Furthermore, in some embodiments, the gear system 86 may be omitted where the functionality of the gear system 86 is integrated into another device of the powertrain 80.

During operation of the aircraft propulsion system 20, air enters the engine core 26 through the airflow inlet 44. This air is directed into the core flowpath 110, which core flowpath 110 extends sequentially through the LPC section 48A, the HPC section 48B, the combustor section 49, the HPT section 50A and the LPT section 50B to the core exhaust nozzle 46. The air within the core flowpath 110 may be referred to as core air.

The core air is compressed by the LPC rotor 66 and the HPC rotor 67, and directed into a (e.g., annular) combustion chamber 116 of the combustor 112. Fuel is injected into the combustion chamber 116 through one or more fuel injectors 118 (one visible in FIG. 1) and mixed with the compressed core air to provide a fuel-air mixture. This fuel-air mixture is ignited and combustion products thereof flow through and sequentially cause the HPT rotor 68 and the LPT rotor 69 to rotate. The rotation of the HPT rotor 68 drives rotation of the high speed rotating structure 74 and its HPC rotor 67. The rotation of the LPT rotor 69 drives rotation of the low speed rotating structure 78. The rotation of the low speed rotating structure 78 drives rotation of the first propulsor rotor 22 and the LPC rotor 66. The rotation of the low speed rotating structure 78 also drives rotation of the second propulsor rotor 24 during a select mode or modes of operation; e.g., the second and the third modes of operation. During the first mode of operation, the second propulsor rotor 24 may be stationary.

During at least the first mode of operation, the rotation of the first propulsor rotor 22 propels bypass air (separate from the core air) through the aircraft propulsion system 20 and its bypass flowpath 60 to provide the first direction propulsion; e.g., the forward, horizontal thrust. During at least the second mode of operation, the rotation of the second propulsor rotor 24 propels additional air (separate from the core air and the bypass air) to provide the second direction propulsion; e.g., vertical lift. The aircraft may thereby takeoff, land and/or otherwise hover during the second mode of operation, and the aircraft may fly forward or otherwise move during the first mode of operation.

To facilitate selective rotation of the second propulsor rotor 24 during the various modes of operation, the aircraft propulsion system 20 of FIG. 1 includes one or more lock devices 120A and 120B (generally referred to as 120). The lock device 120A is configured to selectively lock (e.g., stop, prevent) rotation of the sun gear 94 and/or any one or more system elements 24, 86, 90 and 92 coupled to the sun gear 94 during, for example, the first mode of operation. The lock device 120A is configured to selectively unlock (e.g., permit, facilitate) rotation of the sun gear 94 and/or any one or more system elements 24, 86, 90 and 92 coupled to and driven by the sun gear 94 during, for example, the second and/or the third modes of operation. The lock device 120B is configured to selectively lock (e.g., stop, prevent) rotation of the coupling 104 and/or any one or more system elements 84 coupled to the coupling 104 during, for example, the first and/or second modes of operation. The lock device 120B is configured to selectively unlock (e.g., permit, facilitate) rotation of the coupling 104 and/or any one or more system elements 84 coupled to and driven by the coupling 104 during, for example, the third mode of operation.

Figure 4:
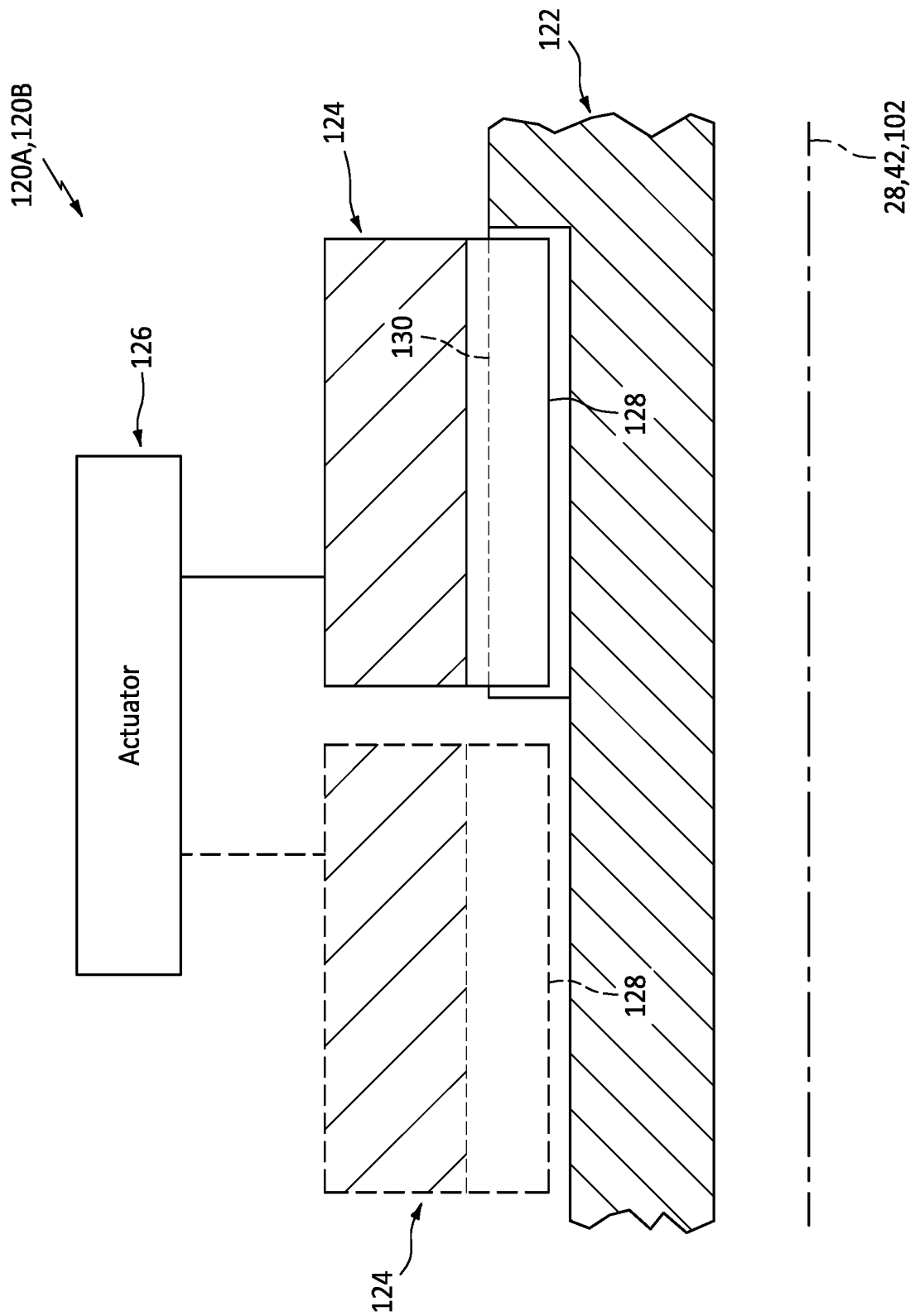
FIG. 4 is a partial side sectional schematic illustration of a lock device.

Referring to FIG. 4, each lock device 120A, 120B may be configured as a splined coupling. More particularly, the lock device 120 of FIG. 4 includes an inner lock element 122 (e.g., a splined shaft), an outer lock element 124 (e.g., a splined sleeve) and an actuator 126. The inner lock element 122 is rotatable about the axis 28, 42, 102. The outer lock element 124 is rotationally fixed about the axis 28, 42, 102. However, the actuator 126 is configured to move (e.g., axially translate) the outer lock element 124 along the axis 28, 42, 102 and the inner lock element 122 between an unlocked position (see dashed line in FIG. 4) and a locked position (see solid line in FIG. 4; see also FIG. 5). At the unlocked position, splines 128 of the outer lock element 124 are disengaged (e.g., spaced) from splines 130 of the inner lock element 122. At the locked position, the splines 128 of the outer lock element 124 are engaged (e.g., meshed) with the splines 130 of the inner lock element 122 (see also FIG. 5). With this arrangement, when the lock device 120 is unlocked and its outer lock element 124 is in the unlocked position, the inner lock element 122 may rotate (e.g., freely, unencumbered by the outer lock element 124) about the axis 28, 42, 102. However, when the respective lock device 120 is locked and its outer lock element 124 is in the locked position of FIG. 5, the outer lock element 124 is meshed with the inner lock element 122 and prevents rotation of the inner lock element 122 about the axis 28, 42, 102.

Figure 5:
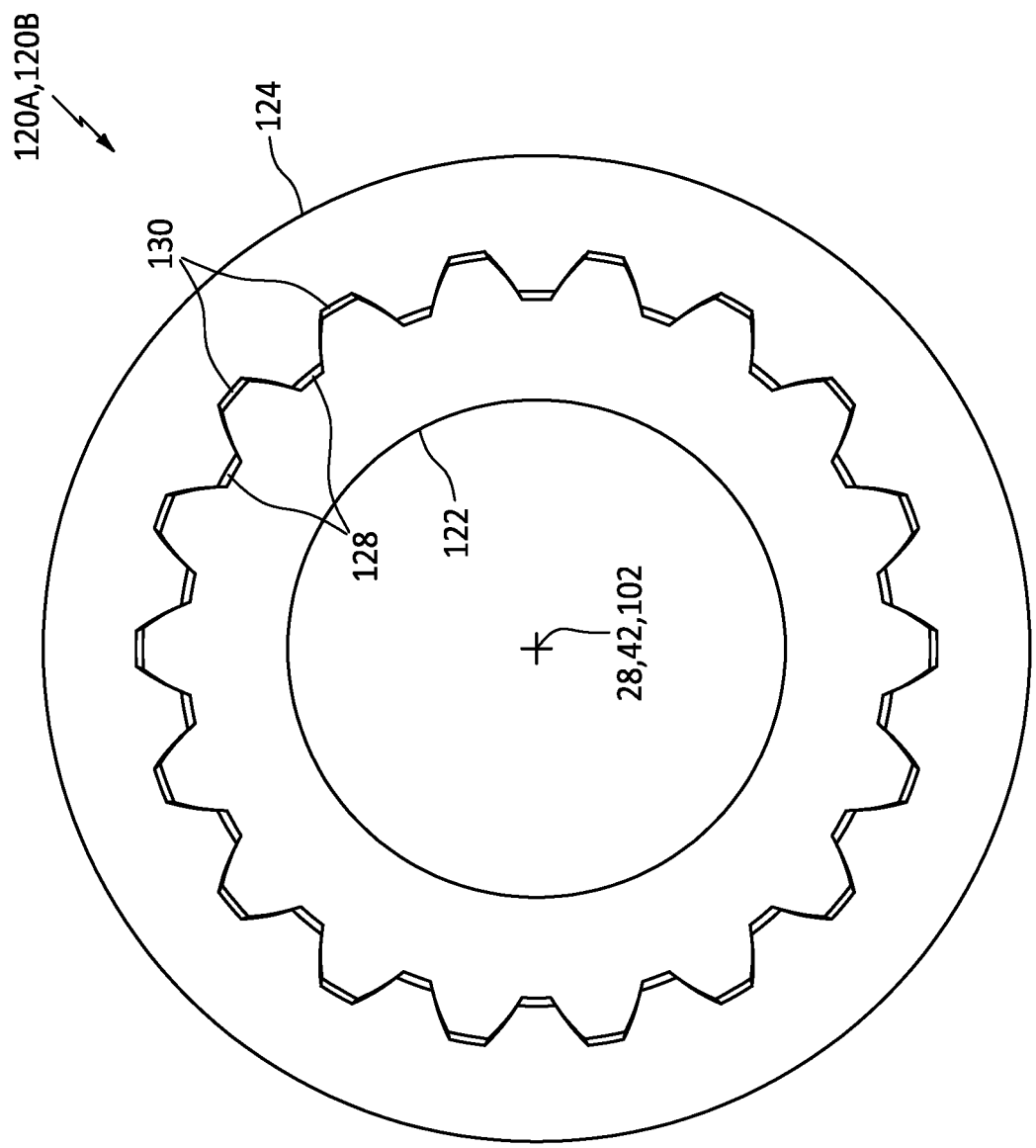
FIG. 5 is a cross-sectional illustration of the lock device of FIG. 4.

Referring to FIGS. 1 and 4, the inner lock element 122 of the lock device 120A may be configured as part of or may be attached (directly or indirectly) to the geartrain output shaft 90, or any other one of the system elements 24, 86, 92 and 94 of FIGS. 1 and 2. The inner lock element 122 of the lock device 120B may be configured as part of or may be attached (directly or indirectly) to the coupling 104, or the system element 84 of FIGS. 1 and 2. While the inner lock element 122 of FIGS. 4 and 5 is described as the rotating element and the outer lock element 124 is described as the rotationally fixed element, the operation of these elements 122 and 124 may be switched in other embodiments. In particular, the inner lock element 122 may alternatively be configured as the rotationally fixed element and axially translatable by the actuator 126, and the outer lock element 124 may be configured as the rotating element. Furthermore, various other types of rotational lock devices are known in the art, and the present disclosure is not limited to any particular ones thereof.

When transitioning into at least the first mode of operation, the auxiliary turbine 84 may be used to facilitate operation of the lock devices 120. For example, where the lock devices 120A and 120B are disengaged (e.g., unlocked) during the second or the third mode of operation, both the first propulsor rotor 22 and the second propulsor rotor 24 may be rotating. To facilitate engagement of the lock device 120A, the auxiliary turbine 84 of FIG. 2 is operated to drive rotation of the ring gear 96 in a first direction about the centerline axis 102. Increasing a rotational speed of the ring gear 96 in the first direction decreases a rotational speed of the sun gear 94 about the centerline axis 102. The auxiliary turbine 84 may thereby increase the rotational speed of the ring gear 96 in the first direction to drive the rotational speed of the sun gear 94 towards (e.g., down to) a zero rotational speed. Once the sun gear 94 is at a zero rotational speed about the centerline axis 102 (e.g., rotationally fixed), the lock device 120A of FIGS. 4 and 5 may be engaged. The auxiliary turbine 84 may then be turned off (e.g., the bleed gas may be cutoff), and the lock device 120A of FIG. 1 may maintain the sun gear 94 rotationally fixed. While the auxiliary turbine 84 is off, rotation of the ring gear 96 may be stopped using an optional brake and the lock device 120B may be engaged. With this arrangement, the second propulsor rotor 24 is rotationally fixed, the first propulsor rotor 22 is rotatably driven by the low speed rotating structure 78 and the aircraft propulsion system 20 is operated in its first mode of operation. Alternatively, the auxiliary turbine 84 may be operated to drive the rotational speed of the coupling/the ring gear 96 towards (e.g., down to) a zero rotational speed. Referring to FIG. 3, this may be accomplished by restricting or stopping the exhausted bleed gas through the exhaust circuit 108 from the auxiliary turbine 84 using a flow regulator 131 (e.g., a valve or other flow restriction device) such that the rotation of the auxiliary turbine 84 compresses the bleed air received form the bleed circuit 106 instead of expanding it. Once the coupling/the ring gear 96 is at a zero rotational speed about the centerline axis 102 (e.g., rotationally fixed), the lock device 120B of FIGS. 4 and 5 may be engaged.

To switch from the first mode of operation to the second mode of operation, the lock device 120A may be disengaged while the ring gear 96 may remain rotationally locked by the lock device 120B. The low speed rotating structure 78 may thereby drive rotation of the second propulsor rotor 24 through the geartrain 82.

During each mode of operation, the low speed rotating structure 78 of FIG. 1 is coupled to the first propulsor rotor 22 (and the LPC rotor 66) through the geartrain 82. Rotation of the first propulsor rotor 22 at or above a certain rotational speed may generate horizontal thrust during the first mode of operation to propel the aircraft horizontally forward. Generating horizontal thrust (or significant amounts of horizontal thrust) may hinder and/or be less advantageous for certain aircraft takeoff, landing and/or hovering maneuvers during the second mode of operation. Furthermore, producing horizontal thrust with the first propulsor rotor 22 during the second mode of operation may also use up engine core power that could otherwise be provided to the second propulsor rotor 24 for vertical aircraft lift. The aircraft propulsion system 20 of FIG. 1 is therefore provided with a propulsion control system 132. This propulsion control system 132 is configured to reduce (or ideally eliminate) the horizontal thrust generated by the first propulsor rotor 22 during the second mode of operation.

The propulsion control system 132 of FIG. 1 includes the engine core 26 and an engine controller 134. The engine controller 134 may be implemented with a combination of hardware and software. The hardware may include at least one processing device 136 and a memory 138. The processing device 136 may include one or more single-core and/or multi-core processors. The hardware may also or alternatively include analog and/or digital circuitry other than that described above.

The memory 138 is configured to store software (e.g., program instructions) for execution by the processing device 136, which software execution may control and/or facilitate performance of one or more operations such as those described below. The memory 138 may be a non-transitory computer readable medium. For example, the memory 138 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The engine controller 134 is configured to selectively control operation of the engine core 26. The engine controller 134, for example, may signal a fuel flow device 140 (e.g., a fuel pump, a fuel valve, etc.) to regulate (e.g., maintain, increase or decrease) fuel delivery to the fuel injectors 118. The engine controller 134 may signal an actuator 142 coupled to a variable vane array within one of the engine sections 48, 50 to regulate (e.g., maintain, increase or decrease) gas flow through the variable vane array. The engine controller 134, of course, may also or alternatively signal one or more other devices within the aircraft propulsion system 20 to influence operation of the engine core 26.

During the first mode of operation, the engine core 26 is operated by the engine controller 134 to rotate the low speed rotating structure 78 at a relatively fast first rotational speed about the axis 28, 42, 102. During the second mode of operation, the engine core 26 is operated by the engine controller 134 to rotate the low speed rotating structure 78 at a relatively slow second rotational speed about the axis 28, 42, 102. The second rotational speed is selected to be less than the first rotational speed. The second rotational speed, for example, may be equal to or less than eighty percent (80%) of the first rotational speed. More particularly, the second rotational speed may be between fifty-five percent (55%) and seventy-five percent (75%) of the first rotational speed. The present disclosure, however, is not limited to such an exemplary relationship.

Rotational speed of the first propulsor rotor 22 may be directly related to the propulsive thrust generated by the first propulsor rotor 22. Therefore, since the low speed rotating structure 78 drives rotation of the first propulsor rotor 22, decreasing the rotational speed of the low speed rotating structure 78 may reduce the propulsive thrust generated by the first propulsor rotor 22. The first propulsor rotor 22 may thereby generate less propulsive thrust during the second mode of operation where the low speed rotating structure 78 is rotating at the relatively slow second rotational speed than during the first mode of operation where the low speed rotating structure 78 is rotating at the relatively fast first rotational speed.

In some embodiments, referring to FIG. 1, the low speed rotating structure 78 may include a compressor rotor; e.g., the LPC rotor 66. The LPC rotor 66 may be coupled to the low speed rotating structure 78 through the geartrain 82. Alternatively, the LPC rotor 66 may be coupled to the low speed rotating structure 78 independent of the geartrain 82. In still other embodiments, the low speed rotating structure 78 may be configured without a compressor rotor; e.g., the LPC rotor 66 may be omitted.

In some embodiments, referring to FIG. 3, the geartrain output shaft 90 may be configured with a flex joint 144; e.g., a flexible coupling. This flex joint 144 is configured to facilitate slight misalignment, axial shifting and/or radial shifting between axially neighboring sections 146A and 146B (generally referred to as 146) of the geartrain output shaft 90. The flex joint 144 of FIG. 3, for example, includes a first diaphragm 148, a second diaphragm 150 and a bridge 152. The first diaphragm 148 is connected to the first shaft section 146A and the bridge 152. This first diaphragm 148 extends radially outward (or inward) from the first shaft section 146A to the bridge 152. The second diaphragm 150 is connected to the second shaft section 146B and the bridge 152. This second diaphragm 150 extends radially outward (or inward) from the second shaft section 146B to the bridge 152. The bridge 152 extends axially along the axis 28, 42, 102 between and to the first diaphragm 148 and the second diaphragm 150. With this arrangement, the first diaphragm 148 and/or the second diaphragm 150 may facilitate slight axial shifts and/or slight pivoting between the respective shaft sections 146.

Figure 6:
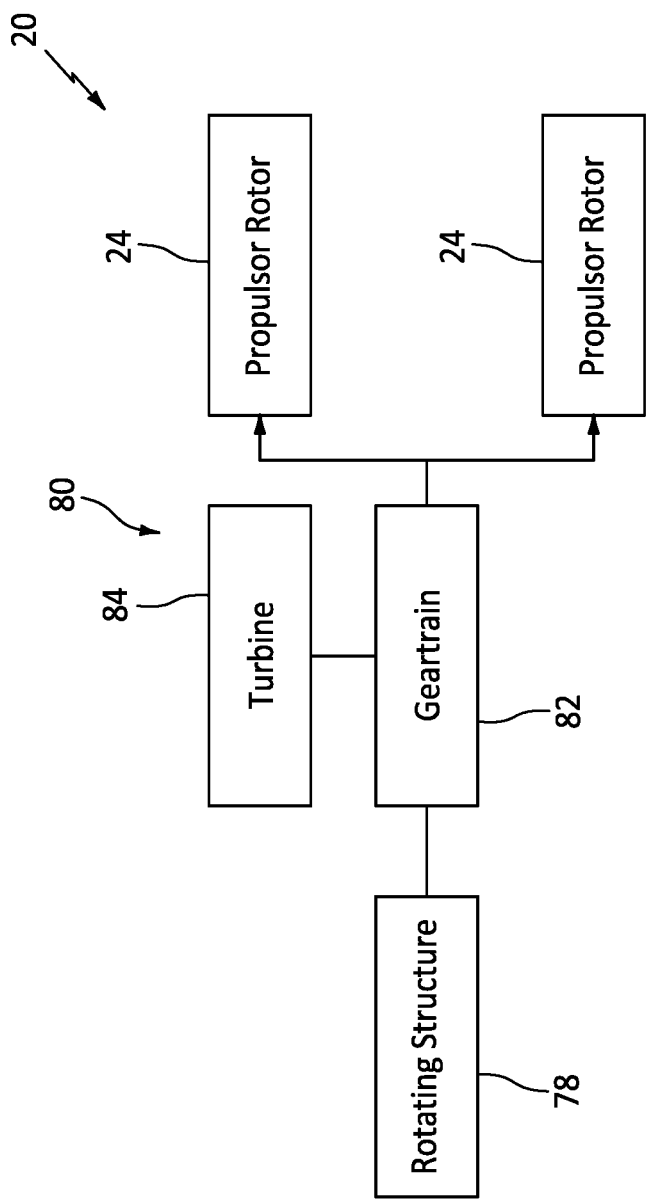
FIG. 6 is a partial schematic illustration of a rotating structure coupled to and driving multiple propulsor rotors for generating propulsive lift.

The engine core 26 may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsors. The aircraft propulsion system 20, for example, may include two or more of the first propulsor rotors 22 and/or two or more of the second propulsor rotors 24. For example, the aircraft propulsion system 20 of FIG. 6 includes multiple second propulsor rotors 24 rotatably driven by the low speed rotating structure 78. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 78 through a power splitting geartrain.

In addition to the foregoing, it is contemplated the auxiliary turbine 84 and the geartrain 82 may be configured with an aircraft propulsion system/a gas turbine engine without a first and second propulsor rotor arrangement as described above. The auxiliary turbine 84 and the geartrain 82, for example, may be configured with a turbofan engine, a turbojet engine, a turboprop engine, a turboshaft engine, a propfan engine, a pusher fan engine, an auxiliary power unit (APU) or any other gas turbine engine which would benefit from tuning rotation of a propulsor rotor (or another engine rotor) with an auxiliary turbine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   a compressor section, a combustor section, a turbine section and a flowpath extending sequentially through the compressor section, the combustor section and the turbine section;
   a rotating structure comprising a turbine rotor within the turbine section;
   a geartrain coupled to the rotating structure;
   a propulsor rotor coupled to the geartrain, the rotating structure configured to drive rotation of the propulsor rotor through the geartrain;
   a turbine coupled to the geartrain, the turbine configured to receive bleed gas from the flowpath; and
   the geartrain comprising:
      a sun gear coupled to the propulsor rotor;
      a ring gear coupled to the turbine;
      a plurality of intermediate gears, each of the plurality of intermediate gears between and meshed with the sun gear and the ring gear; and
      a carrier coupled to the rotating structure, each of the plurality of intermediate gears rotatably mounted to the carrier.

2. The assembly of claim 1, wherein the turbine comprises an air turbine.

3. The assembly of claim 1, wherein the bleed gas comprises bleed air from the compressor section.

4. The assembly of claim 1, wherein
   the compressor section includes a low pressure compressor section and a high pressure compressor section; and
   the turbine is configured to receive the bleed gas from the high pressure compressor section.

5. The assembly of claim 1, further comprising:
   a power transmission device coupling the geartrain to the propulsor rotor;
   the turbine configured to drive rotation of the power transmission device through the geartrain.

6. The assembly of claim 5, wherein the turbine is configured to drive rotation of the power transmission device down to a zero rotational speed.

7. The assembly of claim 6, further comprising a lock device configured to lock rotation of the power transmission device when the power transmission device is at the zero rotational speed.

8. The assembly of claim 7, wherein the lock device comprises a splined coupling.

9. The assembly of claim 1, wherein the turbine is configured to drive rotation of the sun gear down to a zero rotational speed.

10. The assembly of claim 9, further comprising a lock device configured to lock rotation of the sun gear when the sun gear is at the zero rotational speed.

11. The assembly of claim 1, further comprising a lock device configured to lock rotation of the ring gear when the ring gear is at a zero rotational speed.

12. The assembly of claim 1, further comprising:
   a first propulsor rotor;
   the rotating structure configured to drive rotation of the first propulsor rotor through the geartrain; and
   the propulsor rotor is a second propulsor rotor.

13. The assembly of claim 12, wherein the turbine is configured to stop rotation of the second propulsor rotor while the first propulsor rotor continues to rotate.

14. The assembly of claim 12, wherein a rotational axis of the first propulsor rotor is angularly offset from a rotational axis of the second propulsor rotor.

15. The assembly of claim 1, further comprising a flex joint connecting the geartrain to the propulsor rotor.

16. An assembly for an aircraft propulsion system, comprising:
   a first propulsor rotor;
   a second propulsor rotor;
   a geartrain;
   an engine core including a compressor section, a combustor section, a turbine section, a flowpath and a rotating structure, the flowpath extending through the compressor section, the combustor section and the turbine section, the rotating structure comprising a turbine rotor within the turbine section, and the rotating structure configured to drive rotation of the first propulsor rotor and the second propulsor rotor through the geartrain;
   a turbine configured to drive rotation of the second propulsor rotor through the geartrain, the turbine configured to receive bleed gas from the flowpath; and
   the geartrain comprising:
      a sun gear coupled to the second propulsor rotor;
      a ring gear coupled to the turbine;
      a plurality of intermediate gears, each of the plurality of intermediate gears between and meshed with the sun gear and the ring gear; and
      a carrier coupled to the rotating structure and the first propulsor rotor,
   each of the plurality of intermediate gears rotatably mounted to the carrier.

17. An assembly for an aircraft propulsion system, comprising:
   a propulsor rotor;
   an engine core including a compressor section, a combustor section, a turbine section, a flowpath and a rotating structure, the flowpath extending through the compressor section, the combustor section and the turbine section, the rotating structure comprising a turbine rotor within the turbine section, and the rotating structure configured to drive rotation of the propulsor rotor;
   an air turbine configured to receive bleed air from the compressor section, the air turbine configured to drive rotation of the propulsor rotor; and
   an epicyclic geartrain comprising:
      a sun gear coupled to the propulsor rotor;
      a ring gear coupled to the air turbine;

a plurality of intermediate gears, each of the plurality of intermediate gears between and meshed with the sun gear and the ring gear; and a carrier coupled to the rotating structure, each of the plurality of intermediate gears rotatably mounted to the carrier.

\* \* \* \* \*